US010592527B1

(12) United States Patent
Jia et al.

(10) Patent No.: US 10,592,527 B1
(45) Date of Patent: Mar. 17, 2020

(54) TECHNIQUES FOR DUPLICATING DEDUPLICATED DATA

(71) Applicant: Veritas Technologies LLC, Mountain View, CA (US)

(72) Inventors: Yingsong Jia, Beijing (CN); William Joseph Browning, Blaine, ME (US); Yong Tian, Beijing (CN)

(73) Assignee: Veritas Technologies LLC, Santa Clara, CA (US)

( * ) Notice: Subject to any disclaimer, the term of this patent is extended or adjusted under 35 U.S.C. 154(b) by 384 days.

(21) Appl. No.: 13/762,183

(22) Filed: Feb. 7, 2013

(51) Int. Cl.
*G06F 16/27* (2019.01)

(52) U.S. Cl.
CPC .................... *G06F 16/27* (2019.01)

(58) Field of Classification Search
CPC ......... G06F 17/30575; G06F 17/30067; G06F 17/30286; G06F 16/27
USPC ........................................................ 707/610
See application file for complete search history.

(56) References Cited

U.S. PATENT DOCUMENTS

| | | | |
|---|---|---|---|
| 6,771,193 B2* | 8/2004 | Craft ................................ 341/67 |
| 7,133,989 B2* | 11/2006 | Burton et al. ................. 711/162 |
| 7,360,113 B2* | 4/2008 | Anderson et al. ............. 714/5.1 |
| 7,617,256 B2* | 11/2009 | Mohamed et al. |
| 8,112,406 B2* | 2/2012 | Paknad et al. ................. 707/706 |
| 8,171,063 B1* | 5/2012 | Janakiraman ....... G06F 16/1752 707/822 |
| 8,290,911 B1* | 10/2012 | Janakiraman ....... G06F 16/1752 707/640 |
| 8,539,148 B1* | 9/2013 | Chen ...................... G06F 3/0608 711/112 |
| 8,732,403 B1* | 5/2014 | Nayak ................... G06F 3/0641 711/135 |
| 8,825,972 B1* | 9/2014 | Tsaur .................. G06F 11/1453 707/646 |
| 9,235,535 B1* | 1/2016 | Shim ........................ G06F 12/16 |
| 2007/0185936 A1* | 8/2007 | Derk et al. ..................... 707/204 |
| 2009/0271402 A1* | 10/2009 | Srinivasan ............ G06F 16/174 |
| 2010/0088296 A1* | 4/2010 | Periyagaram ........... G06F 3/061 707/705 |
| 2010/0121825 A1* | 5/2010 | Bates ................. G06F 17/30156 707/692 |
| 2010/0205389 A1* | 8/2010 | Kishi ............................ 711/162 |
| 2011/0040728 A1* | 2/2011 | Akirav et al. ................. 707/634 |
| 2012/0084518 A1* | 4/2012 | Vijayan ............... G06F 11/1453 711/162 |
| 2013/0054906 A1* | 2/2013 | Anglin ................. G06F 17/3015 711/159 |
| 2013/0054927 A1* | 2/2013 | Raj ........................ G06F 3/0608 711/170 |

(Continued)

*Primary Examiner* — Tony Mahmoudi
*Assistant Examiner* — Michael Le
(74) *Attorney, Agent, or Firm* — Patent Law Works LLP (57) ABSTRACT

Techniques for duplicating deduplicated data include identifying a connection between a source deduplicated data storage and a target deduplicated data storage. A location of a block of data is determined that is located on the source deduplicated data storage for copying to the target deduplicated data storage. A first reference on the target deduplicated data storage is created to the location of the block of data on the source deduplicated data storage. A second reference is created on the source deduplicated data storage to the location of the block of data on the source deduplicated data storage.

16 Claims, 4 Drawing Sheets

(56) References Cited

U.S. PATENT DOCUMENTS

| | | | |
|---|---|---|---|
| 2013/0086006 A1* | 4/2013 | Colgrove | G06F 3/0608 |
| | | | 707/692 |
| 2013/0086009 A1* | 4/2013 | Li | G06F 16/1752 |
| | | | 707/692 |
| 2014/0143213 A1* | 5/2014 | Tal | G06F 16/2365 |
| | | | 707/692 |

* cited by examiner

TECHNIQUES FOR DUPLICATING DEDUPLICATED DATA

FIELD OF THE DISCLOSURE

The present disclosure relates generally to deduplicated data stores and, more particularly, to techniques for duplicating deduplicated data stored therein.

BACKGROUND OF THE DISCLOSURE

Deduplicated data stores provide efficient means for storing data. For example, if two users both save a copy of the same file, the deduplicated data store may only store one copy of the file in its memory and provide references to the single copy to both users. The deduplicated data store may retain the single copy of the file's data as long as at least one user retains a reference to it. Deduplicated data stores may be particularly efficient in network environments where many users may attempt to store copies of the same data. The deduplicated data store may divide files and other data into data blocks or other chunks of data for the purpose of detecting, preventing, or removing duplicate files from the data store.

Additionally, deduplicated data stores may be duplicated, replicated, backed up, restored, or otherwise copied to a deduplicated data store at another location. Conventional duplication technologies may copy the data at the original (source) deduplicated data store to the new (target) deduplicated data store before the data may be accessed at the target data store. Consequently, it may be a time consuming process to copy the data that is not yet present at the target. For example, if a virtual machine image is stored on a backup disk on the network, a user may need to wait a long time for a copy of the image to become available.

In view of the foregoing, it may be understood that there may be significant problems and shortcomings associated with conventional technologies for duplicating deduplicated data stores.

SUMMARY OF THE DISCLOSURE

Techniques for duplicating deduplicated data are disclosed. In one particular embodiment, the techniques may be realized as a method for duplicating deduplicated data comprising identifying a connection between a source deduplicated data storage and a target deduplicated data storage, determining a location of a block of data located on the source deduplicated data storage for copying to the target deduplicated data storage, creating a first reference on the target deduplicated data storage to the location of the block of data on the source deduplicated data storage, and creating a second reference on the source deduplicated data storage to the location of the block of data on the source deduplicated data storage.

In accordance with further aspects of this particular embodiment, further comprising copying the block of data on the source deduplicated data storage to the target deduplicated data storage, updating the first reference on the target deduplicated data storage to refer to the location of a copy of the block of data on the target deduplicated data storage, and removing the second reference on the source deduplicated data storage.

In accordance with further aspects of this particular embodiment, further comprising responding to a request for the block of data at the target deduplicated data storage by retrieving a copy of the block of data from the location referenced in the first reference on the target deduplicated data storage via the identified connection.

In accordance with further aspects of this particular embodiment, wherein the connection may conform to a Fibre Channel Protocol.

In accordance with further aspects of this particular embodiment, wherein the source deduplicated data storage may comprise a plurality of images, and wherein each image of the plurality of images may comprise a plurality of blocks of data for copying.

In accordance with further aspects of this particular embodiment, wherein copying the block of data may further comprise copying a plurality of blocks of data in a sequence of locations of the plurality of blocks of data.

In accordance with further aspects of this particular embodiment, wherein determining a location of a block of data located on the source deduplicated data storage may further comprise comparing a fingerprint of the block of data with a set of fingerprints of a plurality of blocks of data at the target deduplicated data storage.

In accordance with further aspects of this particular embodiment, wherein the source deduplicated data storage may prevent deletion of the block of data based on the second reference at the source deduplicated data storage.

In another particular exemplary embodiment, the techniques may be realized as a system for duplicating deduplicated data comprising one or more processors communicatively coupled to a network, wherein the one or more processors are configured to identify a connection between a source deduplicated data storage and a target deduplicated data storage, determine a location of a block of data located on the source deduplicated data storage for copying to the target deduplicated data storage, create a first reference on the target deduplicated data storage to the location of the block of data on the source deduplicated data storage, and create a second reference on the source deduplicated data storage to the location of the block of data on the source deduplicated data storage.

In accordance with additional aspects of this particular embodiment, wherein the one or more processors may be further configured to copy the block of data on the source deduplicated data storage to the target deduplicated data storage, update the first reference on the target deduplicated data storage to refer to the location of a copy of the block of data on the target deduplicated data storage, and remove the second reference on the source deduplicated data storage.

In accordance with additional aspects of this particular embodiment, wherein the one or more processors may be further configured to respond to a request for the block of data at the target deduplicated data storage by retrieving a copy of the block of data from the location referenced in the first reference on the target deduplicated data storage via the identified connection.

In accordance with additional aspects of this particular embodiment, wherein the connection may conform to a Fibre Channel Protocol.

In accordance with additional aspects of this particular embodiment, wherein the source deduplicated data storage may comprise a plurality of images, and wherein each image of the plurality of images may comprise a plurality of blocks of data for copying.

In accordance with additional aspects of this particular embodiment, wherein copy the block of data further may comprise copy a plurality of blocks of data in a sequence of locations of the plurality of blocks of data.

In yet another particular exemplary embodiment, the techniques may be realized as an article of manufacture for duplicating deduplicated data, the article of manufacture comprising at least one non-transitory processor readable storage medium, and instructions stored on the at least one medium, wherein the instructions are configured to be readable from the at least one medium by at least one processor and thereby cause the at least one processor to operate so as to identify a connection between a source deduplicated data storage and a target deduplicated data storage, determine a location of a block of data located on the source deduplicated data storage for copying to the target deduplicated data storage, create a first reference on the target deduplicated data storage to the location of the block of data on the source deduplicated data storage, and create a second reference on the source deduplicated data storage to the location of the block of data on the source deduplicated data storage.

In accordance with additional aspects of this particular embodiment, the instructions may cause the at least one processor to operate further so as to copy the block of data on the source deduplicated data storage to the target deduplicated data storage, update the first reference on the target deduplicated data storage to refer to the location of a copy of the block of data on the target deduplicated data storage, and remove the second reference on the source deduplicated data storage.

In accordance with additional aspects of this particular embodiment, the instructions may cause the at least one processor to operate further so as to respond to a request for the block of data at the target deduplicated data storage by retrieving a copy of the block of data from the location referenced in the first reference on the target deduplicated data storage via the identified connection.

In accordance with additional aspects of this particular embodiment, wherein the connection may conform to a Fibre Channel Protocol.

In accordance with additional aspects of this particular embodiment, wherein the source deduplicated data storage may comprise a plurality of images, and wherein each image of the plurality of images may comprise a plurality of blocks of data for copying.

In accordance with additional aspects of this particular embodiment, wherein copy the block of data may further comprise copy a plurality of blocks of data in a sequence of locations of the plurality of blocks of data.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
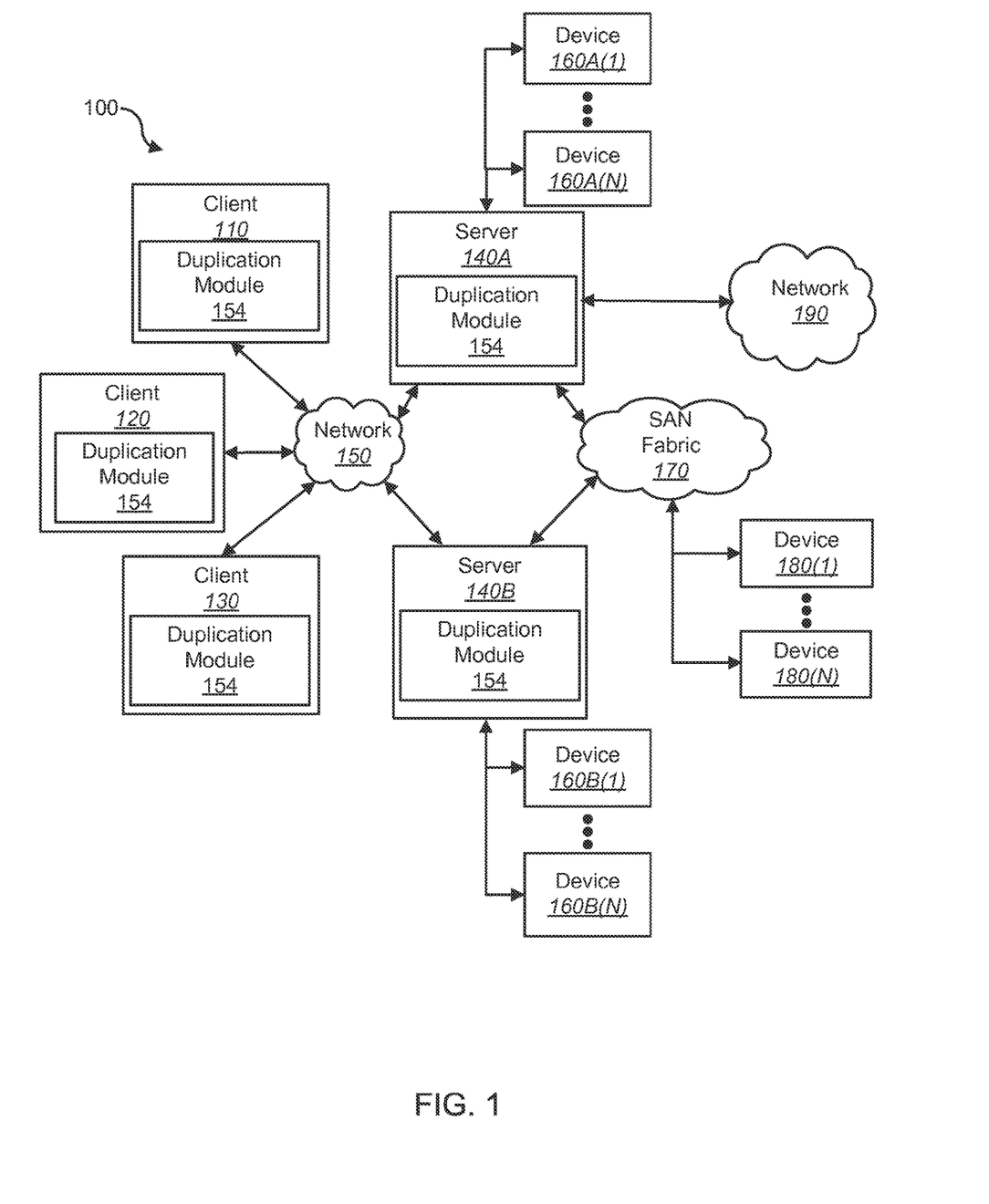
FIG. 1 shows a block diagram depicting a network architecture for duplication in accordance with an embodiment of the present disclosure.

FIG. 1 shows a block diagram depicting a network architecture 100 for duplication in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., duplication module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
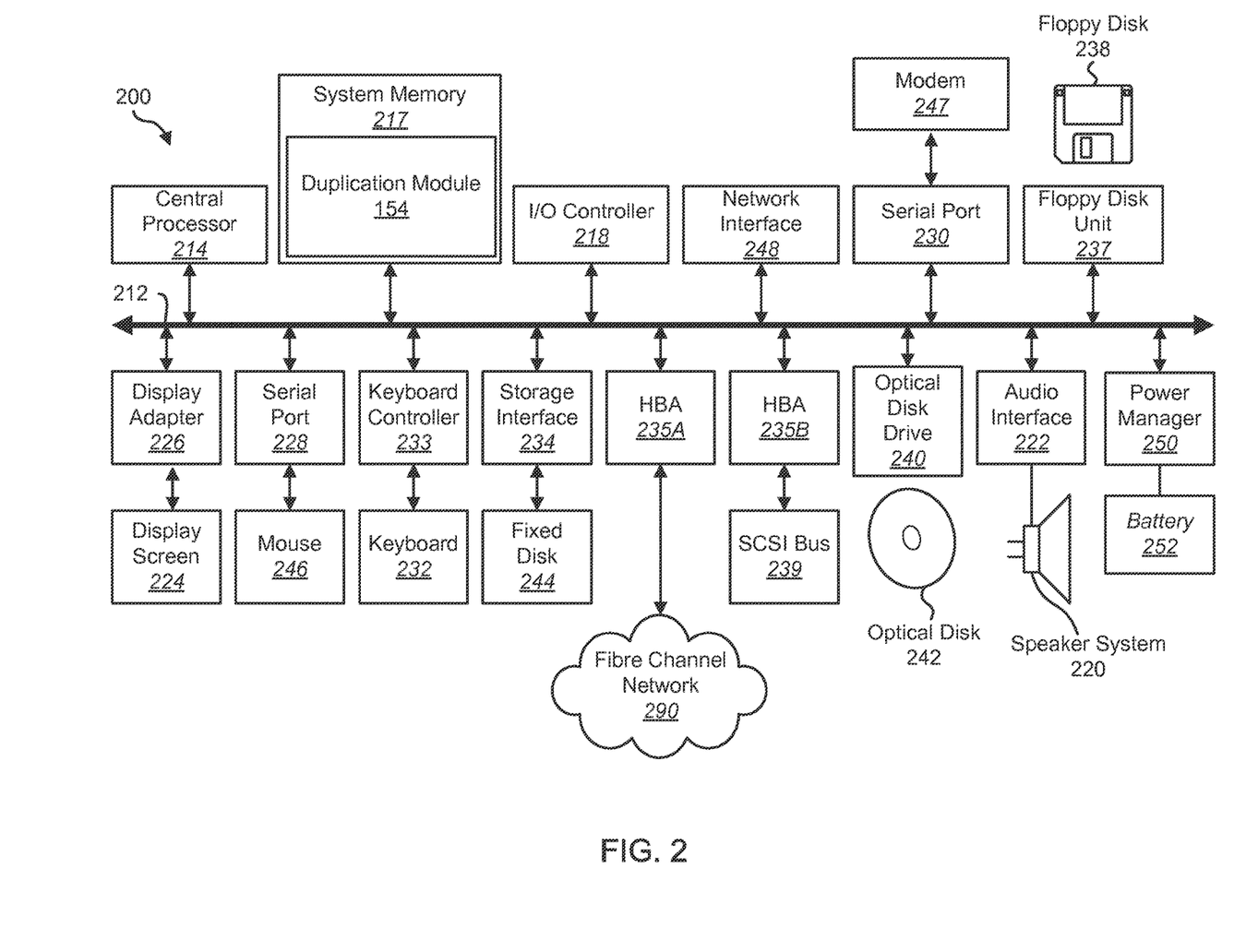
FIG. 2 depicts a block diagram of a computer system for duplication in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180 (1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for duplication such as, for example, duplication module 154. As illustrated, one or more portions of duplication module 154 may reside at a network centric location. For example, server 140A may be a server, a firewall, a gateway, or other network element that may perform one or more actions to scan web applications for vulnerabilities. According to some embodiments, network 190 may be an external network (e.g., the Internet) and server 140A may be a gateway or firewall between one or more internal components and clients and the external network. According to some embodiments, duplication module 154 may be implemented as part of a cloud computing environment.

FIG. 2 depicts a block diagram of a computer system 200 for duplication in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, duplication module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
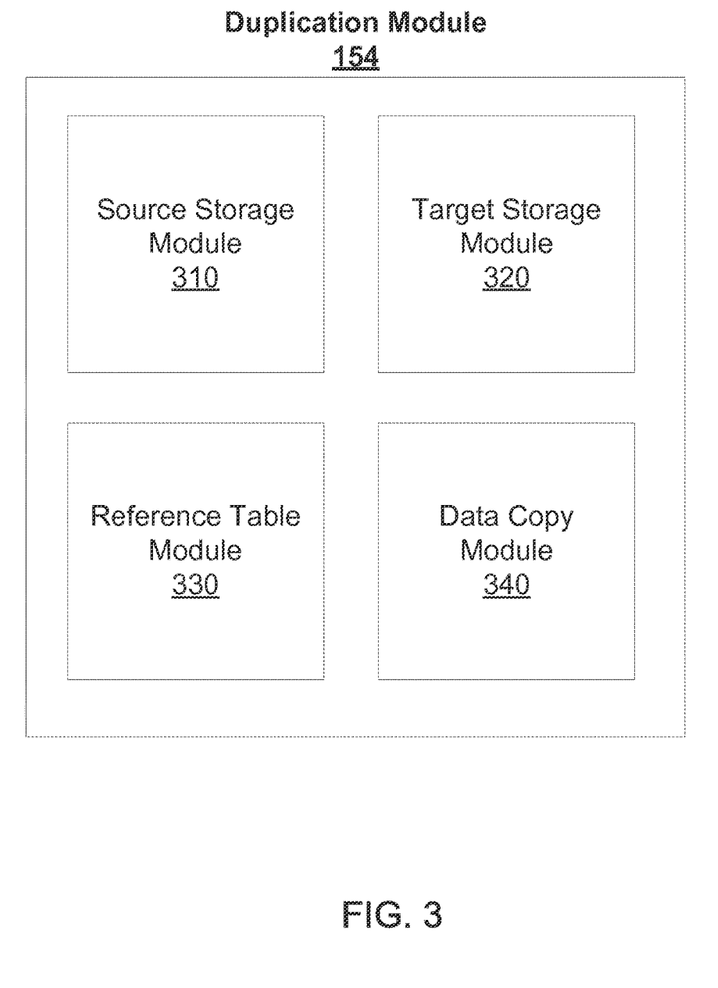
FIG. 3 shows a block diagram of a duplication module in accordance with an embodiment of the present disclosure.

Referring to FIG. 3, there is shown modules of a duplication module 154 in accordance with an embodiment of the present disclosure. A duplication module 154 may contain one or more components including a source storage module 310, a target storage module 320, a reference table module 330, and a data copy module 340.

The description below describes network elements, computers, and/or components of a system and method for duplication that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

In FIG. 3, according to some embodiments, the source storage module 310 may refer to one or more source deduplicated data stores. The data within each source data store of the source module 310 may be divided into a set of data containers, whereby each data container in the set has a unique data container identifier. Each data container may contain a set of data blocks. The content of each data block in the deduplicated data store may be unique, whereby each data block has a fingerprint, which may be based on a hash or digest function of the individual data block. The source storage module 310 identifies the source deduplicated data stores to be duplicated.

According to some embodiments, the target storage module 320 may refer to a target deduplicated data store. The target module 320 may be connected to the source module 310 by a data transport protocol. The data transport protocol may be optimized for low latency and high bandwidth data transmission, such as Fibre Channel Protocol (FCP) over a Fibre Channel (FC) storage area network (SAN). The target deduplicated data store may be configured to receive copies of data blocks from the source deduplicated data stores identified in the source module 310. The target module 320 may perform "virtual writes," creating references in the target data store that refer to data blocks and data containers residing with a source data store identified in the source module 310. If a virtually written data block is requested, the target module 320 may use the virtual reference to obtain the data from its location within a source data store via its data connection to the source module 310.

Because the process of performing virtual writes to duplicate an image of a source deduplicated data store may be decoupled from the process of copying the underlying data, the target storage module 320 may make an image on the target data store available for use before the actual data has been copied.

According to some embodiments, the reference table module 330 generates a reference table that manages information about data blocks in source data stores identified in the source module 310. Specifically, the reference table may reside in a source data store and identify data blocks that have been "virtually written" to the target data store during a duplication process. The source data stores of the source module 310 are prevented from deleting or otherwise modifying the data blocks identified in the reference table at least until they are no longer needed by the target data store. When the data blocks are no longer needed by the target data store, the reference table module 330 may modify or delete the reference table from the source data store, and the previously protected data blocks may be deleted or otherwise modified.

According to some embodiments, the data copy module 340 manages the data copy process of data blocks from the source storage module 310 to the target storage module 320. In some embodiments, the data copy process may be invoked after the reference table module 330 has generated the reference table for one or more source images in one or more source data stores. In other embodiments, the data copy process is a daemon or background process that runs in parallel during duplication. Whereas the target storage module 320 initially performs a virtual write, referring back to data stored within a source data module, the data copy module 340 copies the data from the source data store to the target data store. Once a copy of a data block resides on the target data store, the reference to the data location on the source data store may be updated to reflect the location of the data on the target data store. In some embodiments, the redirection of data block references may be performed after the data copy process has finished copying all of the data blocks that the target storage module 320 had virtually written.

In some embodiments, the data copy process may be optimized by sorting data blocks to be copied by data container identifier so that reading of the data blocks may be performed sequentially. In some embodiments, the data copy process may be further optimized by bundling data blocks from multiple images together for transmission.

Because the process of copying the underlying data may be decoupled from the process of performing virtual writes to duplicate an image of a source deduplicated data store, the target storage module 320 may make an image on the target data store available for use before the data copy process managed by the data copy module 340 has completed.

Figure 4:
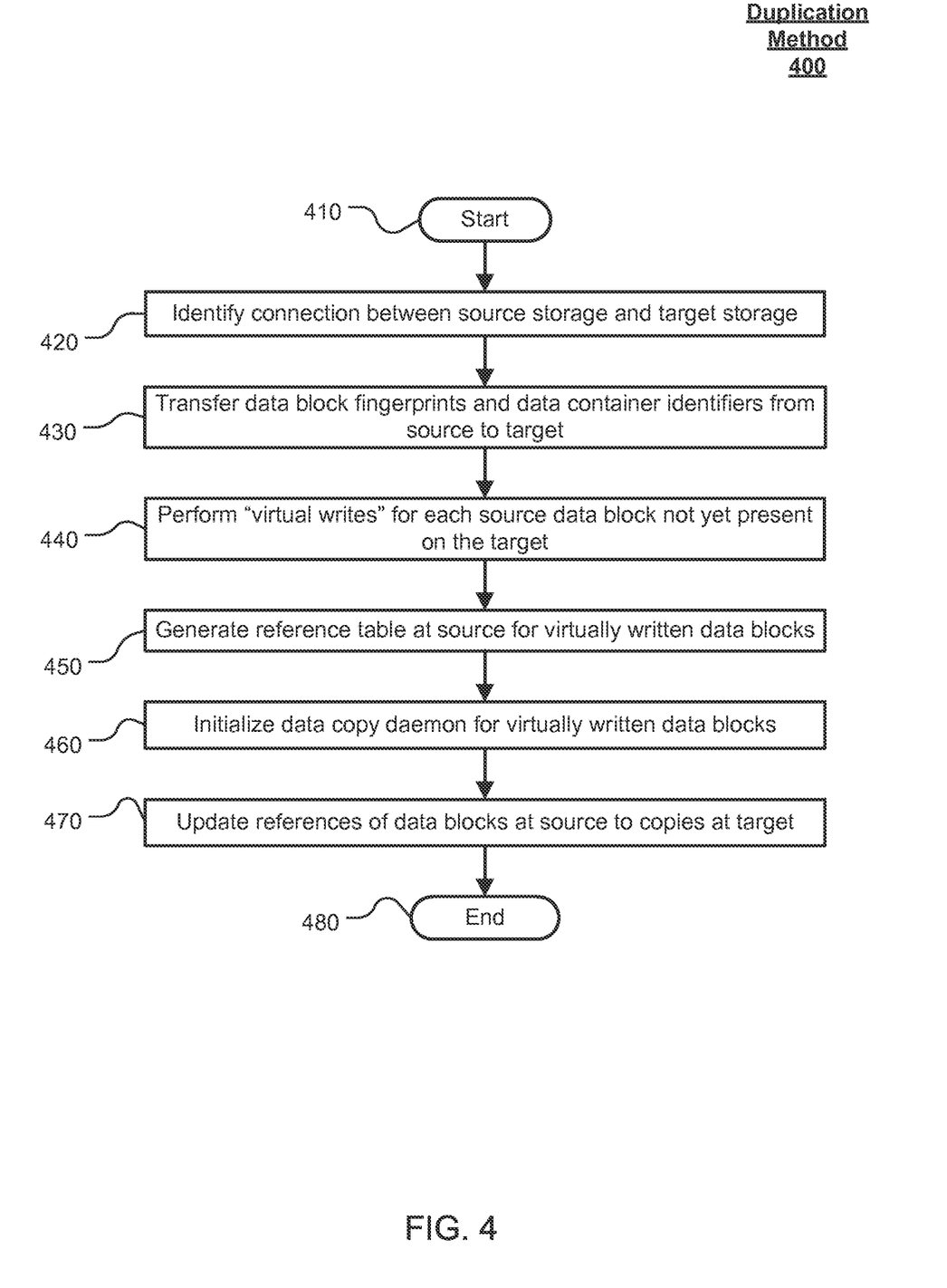
FIG. 4 shows a method for duplication in accordance with an embodiment of the present disclosure.

Referring to FIG. 4, there is depicted a method 400 for duplication in accordance with an embodiment of the present disclosure. At block 410, the method 400 may begin.

At block 420, a connection between source storage and target storage may be identified. In some embodiments, the connection may be a low latency and high bandwidth connection, such as Fibre Channel in a SAN. There may be multiple images across multiple source deduplicated data stores for duplication to the target deduplicated data store.

At block 430, data block fingerprints and data container identifiers may be transferred over the connection from the source storage to the target storage. For example, each source data store may be divided into a set of data containers, and each data container may have a unique identifier. Each data container may contain a set of data blocks, and each data block may have a fingerprint, such as the value of a hash function or message digest function. After requesting duplication to the target store, the source store may aggregate a list or table of data block fingerprints and the corresponding data container location for some or all of the data blocks in the data store. The target data store may compare the received list of fingerprints to the fingerprints of the data blocks already present on the target data store. If a matching fingerprint is found, then it is likely to be a duplicate data block for which the underlying data may not need to be copied as well. If a non-matching fingerprint is found, then it is a non-duplicate data block for which the underlying data may eventually need to be copied.

At block 440, virtual writes may be performed for each data block at the source storage that is not yet present on the target storage (i.e., the non-duplicate data blocks). During the virtual write, the target store makes a reference to the location of the data block on the source storage, such as by using the data container identifier and fingerprint of the data block to be virtually written. Subsequently, if an attempt is made to access the virtually written data block, the underlying data may be retrieved from the corresponding location on the source data store via the connection identified at block 420. In some embodiments, after the non-duplicate data blocks have been virtually written at the target storage, the image may be made available for use.

At block 450, a reference table may be generated at the source storage. The reference table may include identifiers for each data block that had been virtually written at the target storage. In some embodiments, the data blocks referenced in the reference table may be protected from deletion or other modification. The reference table may ensure that the contents of the data block remain available on the source storage for at least as long as the target storage maintains a virtually written reference to the data block's location on the source storage.

At block 460, a data copy process or daemon may be initialized. The data copy process may cause the underlying data of the virtually written data blocks to be copied from the source storage to the target storage. The data copy process may run in the background. In some embodiments, the data copy process may run concurrently with preceding steps in the method, copying some virtually written blocks at the same time other blocks are being virtually written, or while the reference table is generated, or while the image at the target storage is available for use. The data copy process may be optimized by sorting the virtually written data blocks for copying by data container identifier so that they may be read sequentially. The data copy process may be further optimized by bundling the transmission of data for data blocks of multiple images. In some embodiments, the data copy process is decoupled from the virtual write process to decrease the time required to make an image available at the target storage.

At block 470, references to data blocks at the source storage may be updated to refer to locations of the data blocks on the target storage, which had been copied as a result of the data copy process initialized at block 460. In some embodiments, the references may be updated while the data copy process is running In other embodiments, the system may wait for the data copy process to complete before updating references for all of the data blocks that had been virtually written. Furthermore, in some embodiments, the reference table at the source storage may be updated to reflect that a particular data block at the source storage no longer requires protection because the target storage no longer has a dependency on the copy of the data block located at the source storage.

At block 480, the method 400 may end.

At this point it should be noted that duplication in accordance with the present disclosure as described above may involve the processing of input data and the generation of output data to some extent. This input data processing and output data generation may be implemented in hardware or software. For example, specific electronic components may be employed in a duplication module or similar or related circuitry for implementing the functions associated with duplication in accordance with the present disclosure as described above. Alternatively, one or more processors operating in accordance with instructions may implement the functions associated with duplication in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for duplicating deduplicated data comprising:
identifying a connection between a source deduplicated data storage and a target deduplicated data storage;
determining a location of a block of data located on the source deduplicated data storage for copying to the target deduplicated data storage;
creating references identifying data blocks of the source deduplicated data storage virtually written to the target deduplicated data store to ensure that the contents of each data block associated with a virtual write remains available on the source deduplicated data storage for at least as long as the target deduplicated data storage maintains a written reference to the location of the data block on the source deduplicated data storage, including:
creating a first reference on the target deduplicated data storage to the location of the block of data on the source deduplicated data storage; and
creating a second reference on the source deduplicated data storage to the location of the block of data on the source deduplicated data storage, wherein the second reference further indicates that the block of data on the source deduplicated data storage has not been fully copied to the target deduplicated data storage, and wherein an identifier for the block of data is included in a reference table in the source deduplicated data storage to protect the block of data from modification or deletion as long as the first reference on the target deduplicated data storage points to the location of the block of data on the source deduplicated data storage;
responding to a request for the block of data at the target deduplicated data storage by retrieving a copy of the block of data from the location referenced in the first reference on the target deduplicated data storage via the identified connection;
copying the block of data on the source deduplicated data storage to the target deduplicated data storage; and
updating the first reference on the target deduplicated data storage to refer to the location of a copy of the block of data on the target deduplicated data storage; and
removing the second reference on the source deduplicated data storage;

wherein the virtual write is performed to create references to make the target deduplicated data storage available before the actual data is copied with the source deduplicated data storage being prevented from deleting or modifying data blocks identified in the reference table until at least they are no longer needed in by the target deduplicated data storage.

2. The method of claim 1, wherein the connection conforms to a Fibre Channel Protocol.

3. The method of claim 1, wherein the source deduplicated data storage comprises a plurality of images, and wherein each image of the plurality of images comprises a plurality of blocks of data for copying.

4. The method of claim 1 wherein copying the block of data further comprises copying a plurality of blocks of data in a sequence of locations of the plurality of blocks of data.

5. The method of claim 1, wherein determining a location of a block of data located on the source deduplicated data storage further comprises comparing a fingerprint of the block of data with a set of fingerprints of a plurality of blocks of data at the target deduplicated data storage.

6. The method of claim 1, wherein the source deduplicated data storage includes a set of data containers in which each data container contains a set of data blocks and the method further comprises: transferring data container identifiers over the connection from the source deduplicated data storage to the target deduplicated data storage; and performing virtual writes for each source data block at the source deduplicated data storage not yet present on the target deduplicated data storage.

7. A system for duplicating deduplicated data comprising:
one or more processors communicatively coupled to a network; wherein the one or more processors are configured to:
identify a connection between a source deduplicated data storage and a target deduplicated data storage;
determine a location of a block of data located on the source deduplicated data storage for copying to the target deduplicated data storage;
create references identifying data blocks of the source deduplicated data storage virtually written to the target deduplicated data store to ensure that the contents of each data block associated with a virtual write remains available on the source deduplicated data storage for at least as long as the target deduplicated data storage maintains a written reference to the location of the data block on the source deduplicated data storage including:
create a first reference on the target deduplicated data storage to the location of the block of data on the source deduplicated data storage; and
create a second reference on the source deduplicated data storage to the location of the block of data on the source deduplicated data storage, wherein the second reference further indicates that the block of data on the source deduplicated data storage has not been fully copied to the target deduplicated data storage, and wherein an identifier for the block of data is included in a reference table in the source deduplicated data storage to protect the block of data from modification or deletion as long as the first reference on the target deduplicated data storage points to the location of the block of data on the source deduplicated data storage;
respond to a request for the block of data at the target deduplicated data storage by retrieving a copy of the block of data from the location referenced in the first reference on the target deduplicated data storage via the identified connection;
copy the block of data on the source deduplicated data storage to the target deduplicated data storage;
update the first reference on the target deduplicated data storage to refer to the location of a copy of the block of data on the target deduplicated data storage; and
remove the second reference on the source deduplicated data storage;
wherein the virtual write is performed to create references to to make the target deduplicated data storage available before the actual data is copied with the source deduplicated data storage being prevented from deleting or modifying data blocks identified in the reference table until at least they are no longer needed by the target deduplicated data storage.

8. The system of claim 7, wherein the connection conforms to a Fibre Channel Protocol.

9. The system of claim 7, wherein the source deduplicated data storage comprises a plurality of images, and wherein each image of the plurality of images comprises a plurality of blocks of data for copying.

10. The system of claim 7, wherein copy the block of data further comprises copy a plurality of blocks of data in a sequence of locations of the plurality of blocks of data.

11. The system of claim 7, wherein the source deduplicated data storage includes a set of data containers in which each data container contains a set of data blocks and wherein the one or more processors are further configured to: transfer data container identifiers over the connection from the source deduplicated data storage to the target deduplicated data storage; and perform virtual writes for each source data block at the source deduplicated data storage not yet present on the target deduplicated data storage, wherein during a virtual write, the target deduplicated data storage makes a reference to the location of the data block on the source deduplicated data storage.

12. An article of manufacture for duplicating deduplicated data, the article of manufacture comprising:
at least one non-transitory processor readable storage medium; and
instructions stored on the at least one medium;
wherein the instructions are configured to be readable from the at least one medium by at least one processor and thereby cause the at least one processor to operate so as to:
identify a connection between a source deduplicated data storage and a target deduplicated data storage;
determine a location of a block of data located on the source deduplicated data storage for copying to the target deduplicated data storage;
create references identifying data blocks of the source deduplicated data storage virtually written to the target deduplicated data store to ensure that the contents of each data block associated with a virtual write remains available on the source deduplicated data storage for at least as long as the target deduplicated data storage maintains a written reference to the location of the data block on the source deduplicated data storage including:
create a first reference on the target deduplicated data storage to the location of the block of data on the source deduplicated data storage; and
create a second reference on the source deduplicated data storage to the location of the block of data on the source deduplicated data storage, wherein the second reference further indicates that the block of data on the source deduplicated data storage has not been fully copied to the target deduplicated data storage, and wherein an identifier for the block of data is included in a reference table in the source deduplicated data storage to protect the block of data from modification or deletion as long as the first reference on the target deduplicated data storage points to the location of the block of data on the source deduplicated data storage; and respond to a request for the block of data at the target deduplicated data storage by retrieving a copy of the block of data from the location referenced in the first reference on the target deduplicated data storage via the identified connection;

copying the block of data on the source deduplicated data storage to the target deduplicated data storage;

updating the first reference on the target deduplicated data storage to refer to the location of a copy of the block of data on the target deduplicated data storage; and removing the second reference on the source deduplicated data storage;

wherein the virtual write is performed to create references to to make the target deduplicated data storage available before the actual data is copied with the source deduplicated data storage being prevented from deleting or modifying data blocks identified in the reference table until at least they are no longer needed by the target deduplicated data storage.

13. The article of manufacture of claim 12, wherein the connection conforms to a Fibre Channel Protocol.

14. The article of manufacture of claim 12, wherein the source deduplicated data storage comprises a plurality of images, and wherein each image of the plurality of images comprises a plurality of blocks of data for copying.

15. The article of manufacture of claim 12, wherein copy the block of data further comprises copy a plurality of blocks of data in a sequence of locations of the plurality of blocks of data.

16. The article of manufacture of claim 12, wherein the source deduplicated data storage includes a set of data containers in which each data container contains a set of data blocks and wherein the one or more processors are further configured to: transfer data container identifiers over the connection from the source deduplicated data storage to the target deduplicated data storage; and perform virtual writes for each source data block at the source deduplicated data storage not yet present on the target deduplicated data storage, wherein during a virtual write, the target deduplicated data storage makes a reference to the location of the data block on the source deduplicated data storage.

* * * * *

UNITED STATES PATENT AND TRADEMARK OFFICE
CERTIFICATE OF CORRECTION

PATENT NO. : 10,592,527 B1
APPLICATION NO. : 13/762183
DATED : March 17, 2020
INVENTOR(S) : Yingsong Jia et al.

Page 1 of 1

It is certified that error appears in the above-identified patent and that said Letters Patent is hereby corrected as shown below:

In the Claims

In Column 11, Line 6, please replace "until at least they are no longer needed in by the target" with --until at least they are no longer needed by the target--

In Column 12, Line 12, please replace "to to make the target deduplicated data storage" with --to make the target deduplicated data storage--

In Column 13, Line 24, please replace "to to make the target deduplicated data storage" with --to make the target deduplicated data storage--

Signed and Sealed this
Twenty-fifth Day of August, 2020

Andrei Iancu
*Director of the United States Patent and Trademark Office*